UNITED STATES PATENT OFFICE.

ALEXANDER S. RAMAGE, OF BUFFALO, NEW YORK, ASSIGNOR TO INTERNATIONAL COLOR & CHEMICAL COMPANY, INCORPORATED, OF DETROIT, MICHIGAN, A CORPORATION OF NEW YORK.

PROCESS OF PREPARING LEAD SULFATE.

1,168,418.  Specification of Letters Patent.  Patented Jan. 18, 1916.

No Drawing.  Application filed April 16, 1915. Serial No. 21,873.

*To all whom it may concern:*

Be it known that I, ALEXANDER S. RAMAGE, a subject of the King of Great Britain, residing at Buffalo, in the county of Erie and State of New York, have invented certain new and useful Improvements in Processes of Preparing Lead Sulfate, of which the following is a specification.

The object of this invention is to provide a simple and economical process of preparing pure sulfate of lead from sulfid ores thereof.

An illustrative example in accordance with the invention is as follows:—The sulfid ore of lead, usually galena, is charged in the form of powder into a roasting furnace which has been previously heated to dull redness, and is roasted for approximately one hour, during which time the admission of air is restricted as far as possible. Under these conditions, about one-third of the sulfur is driven off without materially fluxing or fusing the ore, the temperature rising in the meantime to bright redness. After about one hour, air is admitted to the charge, and the latter is stirred, preferably by mechanical devices, for about another hour, at the end of which period the charge is drawn.

The roasted charge prepared as above is found to consist of a mixture of lead oxid, lead sulfate, and lead sulfid in approximately equal proportions. This mixture is treated with concentrated nitric acid in sufficient proportion to convert the lead oxid to lead nitrate and the lead sulfid to lead sulfate. The nitrous fumes arising from this treatment are permitted to mingle in a tower with the sulfurous gases from the roasting furnace, under conditions to form sulfuric and nitro-sulfuric acids, the conditions being preferably practically those of the usual chamber process. The resulting sulfuric acid, with its nitro-components, is permitted to flow back upon the mixture of lead sulfate and lead nitrate derived from the ore, with the result that the lead is completely converted into sulfate, while at the same time, the nitric acid is again liberated in condition for immediate use in a repetition of the process. The lead sulfate thus prepared is washed free from nitric acid, and is ready for utilization in any desired manner, preferably for conversion into basic chromate of lead under the conditions and in the manner described in my copending application, Serial No. 21,872, filed April 16, 1915.

In case the sulfid ores contain material percentages of silver, this metal accumulates in the nitric acid solution in the course of several repetitions of the process; and this nitric liquor is periodically treated for the recovery of silver, as for example by the Claudét or other suitable process.

I claim:—

1. The process of preparing lead sulfate from sulfid ores of lead, which consists in roasting the ore and thereby producing a mixture containing oxid, sulfate and sulfid of lead; treating the said mixture with nitric acid and combining the evolved nitrous fumes in presence of oxygen with the sulfurous gases from the roasting operation; and utilizing the resulting acid products to complete the conversion of the mixture derived from the ore into sulfate of lead.

2. The process of preparing lead sulfate from sulfid ores of lead, which consists in roasting the ore with restricted access of air during the preliminary roasting stages and with free access of air during the latter roasting stages, thereby producing a roasted mixture containing oxid, sulfate and sulfid of lead; treating the said mixture with nitric acid and combining the evolved nitrous fumes in presence of oxygen with the sulfurous gases from the roasting operation thereby forming sulfuric and nitro-sulfuric acids; and returning the acid products thus formed to the roasted ore, whereby the conversion of the roasted mixture into sulfate is completed and the nitric acid is evolved and recovered in available form for a repetition of the process.

In testimony whereof I affix my signature.

ALEXANDER S. RAMAGE.

Copies of this patent may be obtained for five cents each, by addressing the "Commissioner of Patents, Washington, D. C."